United States Patent [19]

Coker

[11] Patent Number: 5,031,277
[45] Date of Patent: Jul. 16, 1991

[54] DEBRIS COLLECTING AND BAGGING APPARATUS

[76] Inventor: Darby T. Coker, 30 Glen Oaks Dr., Atlanta, Ga. 30327

[21] Appl. No.: 431,379

[22] Filed: Nov. 2, 1989

[51] Int. Cl.$^5$ .................... A47L 13/52; A47L 25/00
[52] U.S. Cl. .................... 15/257.3; 15/257.1; 15/257.4; 15/257.6; 141/108; 141/313; 141/314; 383/1
[58] Field of Search .............. 15/257.1, 257.3, 257.4, 15/257.5, 257.6, 257.7, 257.9; 141/108, 313, 314, 316; 43/7, 8, 11, 14; 383/1

[56] References Cited

U.S. PATENT DOCUMENTS

| | | | |
|---|---|---|---|
| 2,902,705 | 9/1959 | Eistrup | 15/1.7 |
| 3,347,297 | 10/1967 | Garland | 383/1 |
| 4,003,100 | 1/1977 | Whitaker | 15/1.7 |
| 4,152,801 | 5/1979 | Lieber | 15/1.7 |
| 4,442,567 | 4/1984 | Pravettone | 15/257.9 |
| 4,653,214 | 3/1987 | Cline | 43/14 |

FOREIGN PATENT DOCUMENTS 916849 8/1954 Fed. Rep. of Germany ..... 15/257.1

Primary Examiner—Edward L. Roberts
Attorney, Agent, or Firm—Needle & Rosenberg

[57] ABSTRACT

An improved trash and leaf bagging apparatus is constructed of a rigid frame having an opening that is completely surrounded with a supply of netting material that forms a netting bag. The rigid frame may be connected to a handle, to facilitate mobility; the rigid frame may also be connected to a collapsible tunnel assembly that forms a converging tunnel toward the frame opening. Trash, leaves or other refuse is projected through the rigid frame and into the netting bag by means of an air blowing device. When the bag is filled to the desired capacity, the netting material is cut and tied at the open end to form a completely enclosed bag of refuse. A new netting bag may be formed from the supply of netting surrounding the rigid frame and the process repeated.

3 Claims, 2 Drawing Sheets

DEBRIS COLLECTING AND BAGGING APPARATUS

BACKGROUND OF THE INVENTION

This invention relates to a novel collecting and bagging apparatus for leaves, trash and other debris as well as to a method for collecting such debris using the disclosed apparatus.

Numerous devices have been developed and commercialized for the collection of trash, leaves and other refuse. Some such refuse collection devices are described in U.S. Pat. No. 4,442,567, to Pravettone; U.S. Pat. No. 4,357,728, to Pravettone and U.S. Pat. No. 3,170,183, to Leatherman.

The devices described in U.S. Pat. Nos. 4,442,567 and 4,357,728 provide a frame for supporting and transporting a garbage collecting bag. The bag is attached to the top of the frame. The frame has a dustpan extending from one end and is designed so that refuse can be swept through the dustpan and into the bag when the device is placed in a horizontal position. When placed in an upright position, the bag rests on wheels which makes the device easily portable. The frame for the device in the two related patents is dimensionally adjustable.

U.S. Pat. No. 3,170,183 discloses a one-piece, plastic dustpan and basket combination. Debris may be swept directly into the retention basket by placing the device in a horizontal position whereby that the dustpan is placed in position to receive the debris. When in its upright position, the device serves as a trash storage container.

These devices have significant shortcomings. For example, all of these devices require the direct manual transfer of debris into a receptacle, which is an inefficient and time consuming operation. These devices do not permit the efficient transfer of debris into a receptacle by use of air pressure.

SUMMARY OF INVENTION

The present invention comprises a tubular netting material and a frame apparatus for holding open an end of the netting material. It also comprises a method for collecting debris using the disclosed apparatus in conjunction with an air blower.

More specifically, the disclosed apparatus is comprised of a rigid frame structure to which is attached the open end of a netted material in the form of an elongated tube tied at one end. The rigid frame provides an unobstructed opening into the mouth of the netting material. The frame structure preferably also includes an extension from the opening which forms a funnel or converging tunnel which enhances the collection of debris when an air blower is used to blow the debris into the opening. The debris collected may be leaves, trash or anything that is small enough to be caught in the mesh of the netting material.

The rigid frame may be connected to one or more rollers or wheels for easy portability, and also may have a handle to aid mobility. The extension from the rigid frame may be comprised of collapsible parts. The rigid frame may be made of cardboard for a low cost, lightweight product or may be made of durable plastic, metal, fiberglass or other material for a more durable product.

The netting may be a single bag, preferably comprised of a biodegradable material. Alternatively, the netting may be a tube gathered around the rigid-frame. The netting tube attached to the rigid frame may be pulled out to a desired length and tied at the unattached end to form a netted bag. After a netted bag is filled, it can be cut away from the frame and the open end may be tied, leaving an easily collectable bundle of debris. If sufficient netting material is available to form additional netted bags the process may be repeated. The same effect may be accomplished by a circular roll of netting material which is placed around the rigid frame structure. Thus, many netted bags of any desired size can be created and filled with debris from a single roll or supply of netting.

The present invention also provides a method of collecting trash and leaves using the disclosed apparatus. Because the netting material permits the flow of air through the bag, an air blower can be used to transfer debris through the opening of the rigid frame and into the netting material. If a solid bag were used, the blower would be ineffective due to the turbulence and lack of air flow caused by the closed container.

Therefore, it is an object of the present invention to provide a debris collecting apparatus and method that do not require the direct manual transfer of debris into a receptacle.

It is a further object of the present invention to provide such an apparatus that permits the use of an air blower, of the type commonly used for the collection of leaves and other debris, to transfer the refuse into a collection bag.

It is yet another object of the present invention to provide a trash and leaf collecting apparatus that may be used with a biodegradable netting material.

It is another object of the present invention to provide a trash and leaf collecting apparatus that may be equipped with a netting roll that permits the formation of multiple netted bags of any desired length for the collection of leaves and other debris.

These and other objects of the present invention will become apparent to one skilled in the art from the detailed description that follows.

DETAILED DESCRIPTION OF THE PREFERRED EMBODIMENTS

The preferred embodiments of the invention are described with reference to the FIGS. 1–4, wherein like numbers represent like parts throughout the views.

Figure 3:
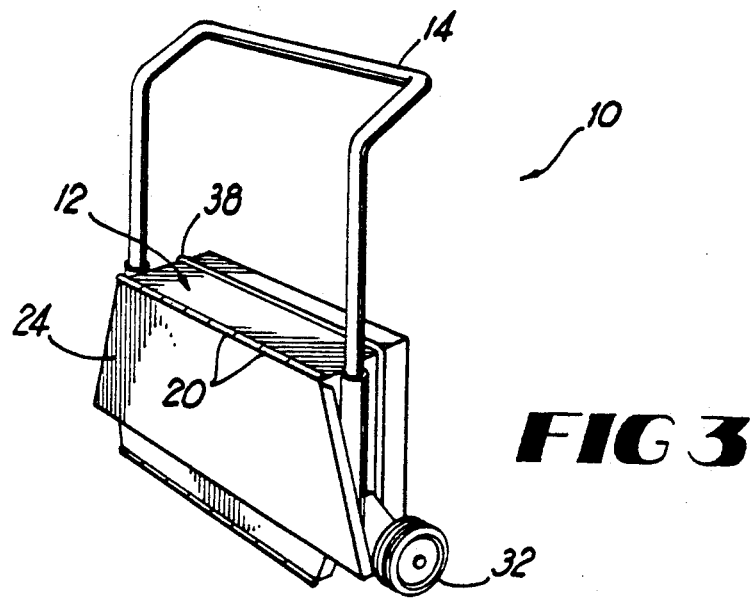
FIG. 3 is a perspective view of the apparatus of the present invention with the moveable flaps in the closed position.

As shown in the figures, the debris collecting and bagging apparatus 10 is comprised of a rigid frame 12 which is connected to a handle 14. A netting material 16 is releasably attached to and completely encloses a first end of the rigid frame 12. The rigid frame 12 preferably forms a rectangular opening at its second end. The rigid frame 12 has means for holding the netting material in place, for example, a lip 33 extending outwardly from the perimeter of the rigid structure as shown in FIG. 3. Preferably, the circumference of the first end of the rigid frame 12 and the netting material 16 are approximately the same so that the netting material 16 fits tightly around the frame 12. Alternatively, the netting material 16 may be held securely in place on the rigid frame 12 by other means, such as an elastic band or tied cord. The netting material 16 may be a single bag attached to the frame 12 at the bag's open end, or alternatively may be a continuous tube of netting rolled or gathered around the lip 38.

Figure 1:
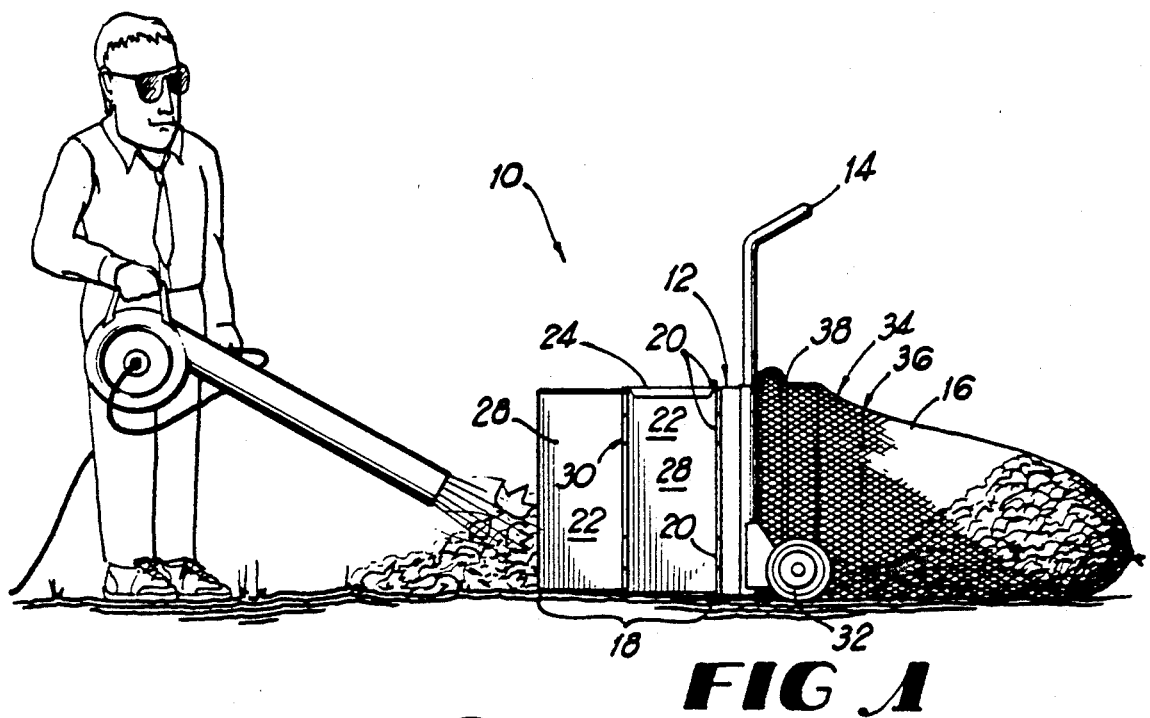
FIG. 1 is a side view of the apparatus of one embodiment of the present invention illustrating the use of an airblower to transfer leaves or other refuse into the netting material.
Figure 2:
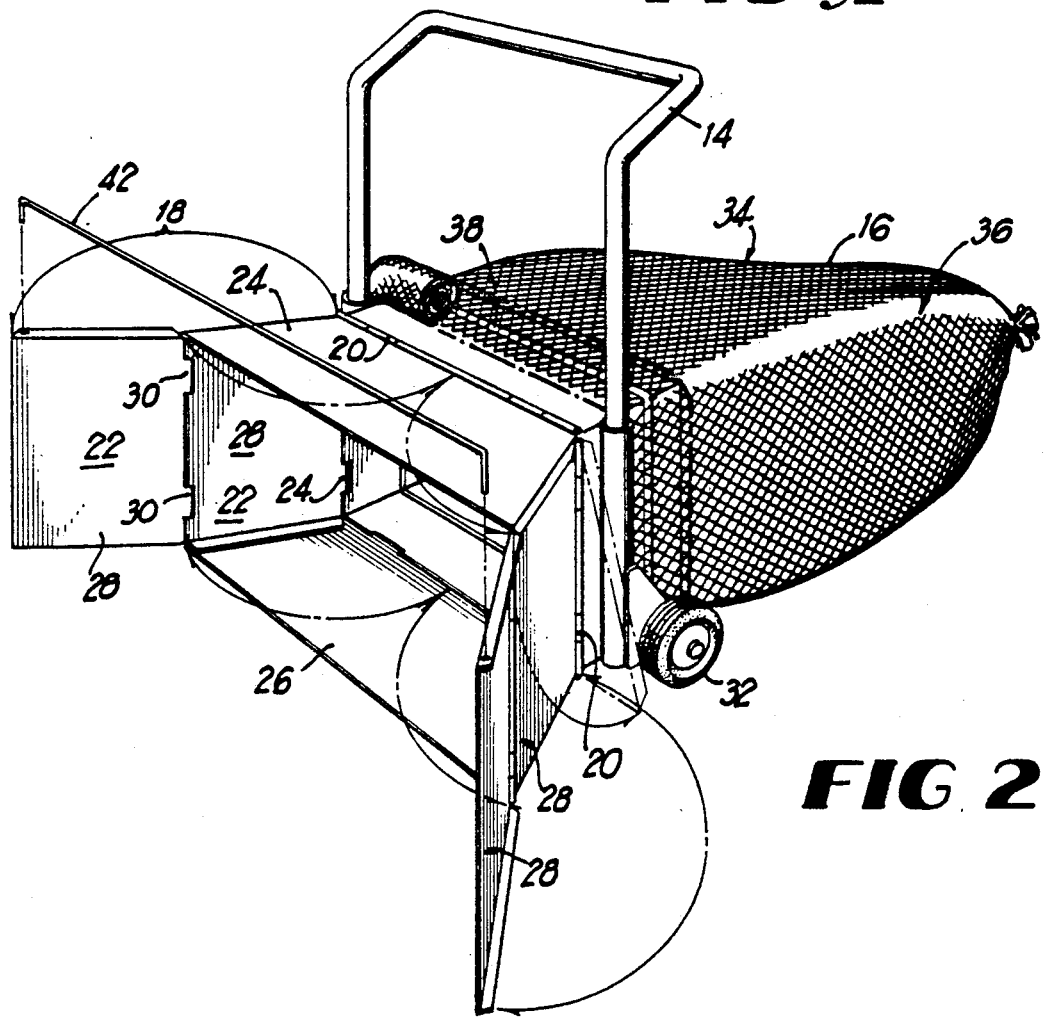
FIG. 2 is a perspective view of the apparatus of the present invention.
Figure 4:
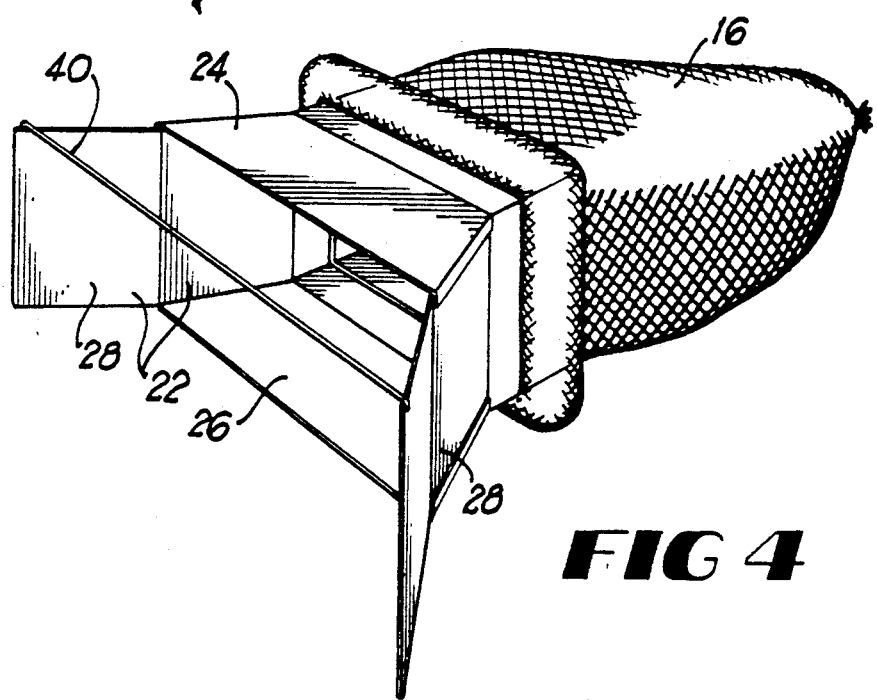
FIG. 4 is a perspective view of an alternative embodiment of the trash and debris collecting and bagging apparatus of the present invention.

In a preferred embodiment, the device 10 may be collapsible for easy movement and storage. A collapsible tunnel assembly 18 is attached to the rigid frame 12 by hinging means 20 as shown in FIG. 1. The collapsible tunnel assembly 18 is comprised of two collapsible side flap assemblies 22, a collapsible top flap 24, and bottom flap 26. Each collapsible side flap assembly 22 is comprised of at least two side flap panels 28 which are movably connected by hinging means 30 and connected to the frame 12 by hinging means 20. Means may also be provided to hold the outermost side flap panels 28 open to create a funnel structure. For example, as shown in FIGS. 2 and 4, a rigid bar 40 may be placed between the side flap panels 28.

The optional handle 14 extends upwardly from the frame 12. Wheels 32 may be provided at the base of the handle 14 to aid in portability of the device 10.

The device 10 may be constructed of a variety of materials depending upon the desired durability. For example, the rigid frame 12 may be constructed of cardboard, wood, aluminum, plastic, fiberglass, or any other suitable rigid material. The handle 14, when used, likewise may be constructed of any suitable rigid material such as aluminum, plastic, fiberglass, wood or steel.

The netting material 16 may be of any suitable material such as nylon, but preferably is made of a biodegradable material. The mesh of the netting material 16 must have openings large enough to allow the free passage of air, but small enough to catch and hold the debris desired to be contained.

A low cost alternative embodiment of the present invention is depicted in FIG. 4. This variation is comprised of the rigid frame 12 to which is attached the netting material 16. Side flap assemblies 22, each comprised of at least two side flap panels 28, are collapsibly attached to rigid frame 12. Top flap 24 is collapsibly attached to rigid frame 12, while bottom flap 26 is rigidly attached to frame 12. A rigid bar 40 may be provided to hold the outermost side flaps 28 apart to form a funnel opening through which leaves and other debris may pass as they are blown into netting material 16. The low cost alternative embodiment excludes the handle 14 and wheels 32 that are present in the preferred embodiment.

The method for using the claimed apparatus is depicted in FIG. 1. A conventional air blowing device is used to direct leaves, refuse and other debris into the collapsible tunnel assembly 18 attached to rigid frame 12. The converging shape of the extension causes the air and debris to be passed through the opening of the frame 12 into the netting material 16 with increased pressure which aids in filling the netting material 16 to capacity. The refuse and leaves are collected in the netting material 16, which allows the free flow of air as the netting material fills.

Figure 5:
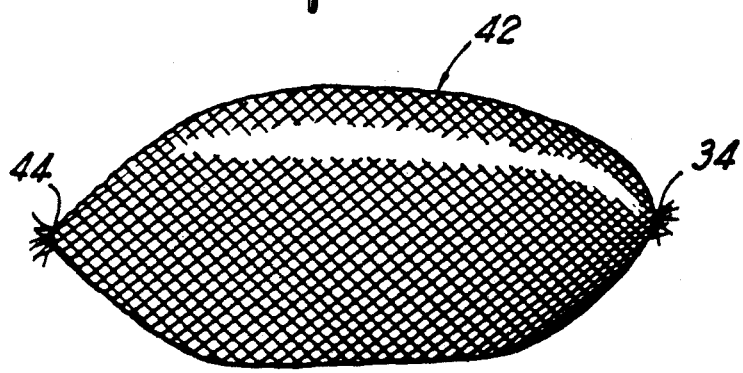
FIG. 5 is a side view of a bag producible from use of the present invention.

When the netting material 16 is filled to the desired capacity with collected debris, it is cut away from the rigid frame 12 at some cutting point 36 and tied off at the cut end 44 to form a completely enclosed netting bag 42 for bagging the debris, as shown in FIG. 5. The end of the netting material 16 that remains connected to rigid frame 12 is tied to form a second netting bag which may subsequently be filled with leaves or other debris. Thus, several bags of debris can be easily filled and left for later collection.

The above examples are not limiting. It will be understood that variations and modifications can be effected within the spirit and scope of the invention as previously described and defined by the claims.

What is claimed is:

1. An apparatus for collecting and bagging debris, comprising:
   a. frame having an opening through which debris may be passed;
   b. netting material releasably attached to said frame for collecting said debris passed through said opening and detachable from said frame to provide means for bagging said collected debris;
   a collapsible tunnel assembly having a top flap, two side flaps and a bottom flap attached to said frame to form a tunnel toward said opening of said frame.

2. The apparatus of claim 1, wherein said side flaps are each comprised of at least two collapsible, distal-directing side flaps.

3. An apparatus for collecting and bagging debris, comprising:
   a. a frame having an opening through which debris may be passed; and
   b. netting material releasably attached to said frame for collecting said debris passed through said opening and detachable from said frame to provide means for bagging said collected debris;
   wherein said netting material is a continuous roll of netting material attached onto said frame to form an excess supply of netting material that may be extended repeatedly to form a series of netted bags removable from said roll.

* * * * *